July 29, 1930. A. KARLSON 1,771,492
POULTRY CRATE
Filed Sept. 30, 1929
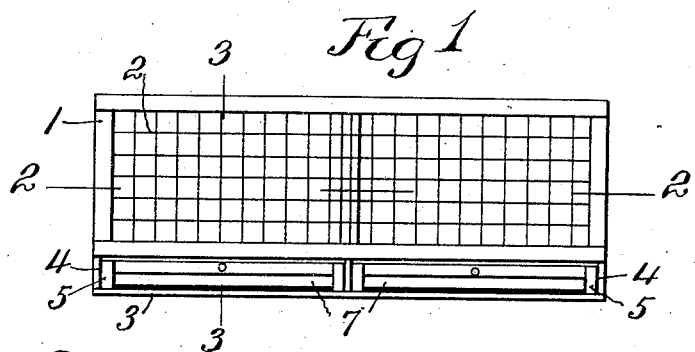
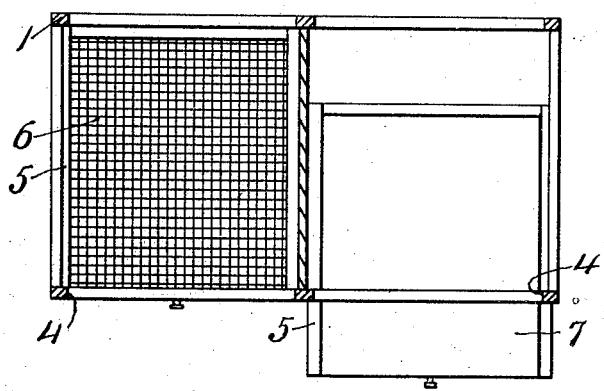
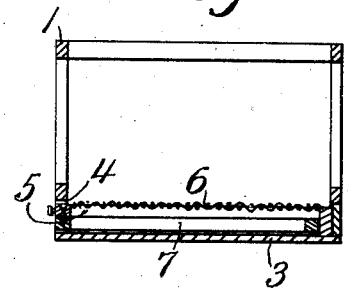
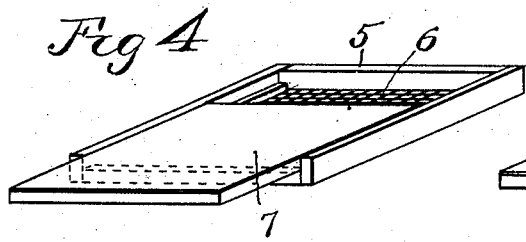
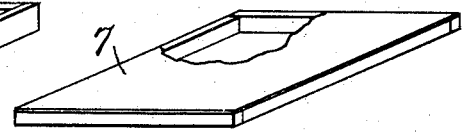
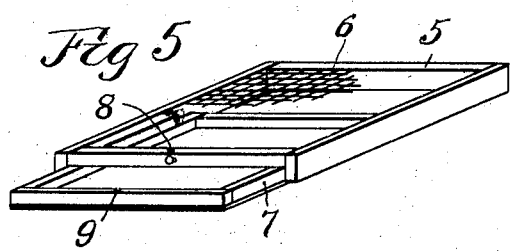
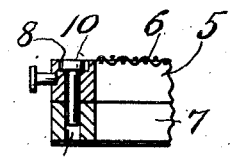
INVENTOR.
Albert Karlson,
BY Warren D. House.
His ATTORNEY.
Witness
H. Vernon Olson Patented July 29, 1930

1,771,492

UNITED STATES PATENT OFFICE

ALBERT KARLSON, OF KANSAS CITY, KANSAS

POULTRY CRATE

Application filed September 30, 1929. Serial No. 396,308.

My invention relates to improvements in poultry crates.

One of the objects of my invention is to provide a novel poultry crate, which is simple, cheap, durable, not likely to get out of order, which can be readily cleaned and is sanitary, and which affords a comfortable footing for the fowls held therein.

The novel features of my invention are hereinafter fully described and claimed.

In the accompanying drawing, which illustrates the preferred embodiment of my invention, Fig. 1 is a front elevation of my improved poultry crate.

Fig. 2 is a section on the line 2—2 of Fig. 1, the screen wiring of the body being omitted, and one drawer being shown partly withdrawn.

Fig. 3 is a section on the line 3—3 of Fig. 1, the wiring of the body being omitted.

Fig. 4 is a perspective view of one of the drawers inverted from the position shown in Figs. 1 and 2, the pan, also inverted, being shown partly withdrawn.

Fig. 5 is a perspective view, partly broken away, of the members shown in Fig. 4, inverted.

Fig. 6 is a perspective view, partly broken away, of one of the pans.

Fig. 7 is an enlarged fragmental section on the line 3—3 of Fig. 1.

Similar reference characters designate similar parts in the different views.

The body of the crate comprises the usual rectangular frame 1, the sides and top of which are covered with wire netting 2, the bottom 3 of the body being closed.

One side, preferably the front, as shown, of the body adjacent to the bottom 3 is provided with one or more drawer openings 4, two being shown in the drawing. Slidable in and out of each opening 4 is an invertible drawer 5, the bottom of which is a screen 6. A pan 7 is slidable in and out through the front end of each drawer 5.

For releasably holding the pan 7 from sliding in the drawer 5, which contains it, the drawer is provided in its front part with a vertical hole 8 which, when the pan is in the closed position, Fig. 7, registers with a vertical hole 9 in the front end of the pan. A removable pin 10 is mounted in the holes 8 and 9.

When the fowls in the crate are being held in storage, the drawers 5 are disposed with the screens 6 uppermost. The meshes of the screens 6 are sufficiently large to permit the droppings to pass therethrough and to be caught on the bottoms of the pans 7, the latter being removed, after withdrawing the pins 10, for cleansing, Figs. 1, 3 and 5.

During transportation of the crate loaded with fowls, the drawers 5 are inverted to the position shown in Fig. 4, and at the right in Fig. 3, in which position, the fowls stand on the smooth bottom of the pans 7, thereby having a comfortable footing without liability of injuring by jolting of the crate. The inverting of the drawers 5 to change the crate from a feeding crate or coop to a shipping crate, or the reverse, may be effected without removing the fowls from the crate.

I do not limit my invention to the structure shown and described, as modifications, within the scope of the appended claims, may be made without departing from the spirit of my invention.

What I claim is:—

1. A poultry crate having a body provided adjacent to its bottom with a lateral opening, an invertible drawer slidable in said opening and having a screen bottom, and a pan slidable in and out through one end of said drawer and having its open side next to said screen, said pan being slidable and invertible with said drawer.

2. A poultry crate having a body provided adjacent to its bottom with a lateral opening, an invertible drawer slidable in said opening and having a screen bottom, a pan slidable in and out through one end of said drawer and having its open side next to said screen, said pan being slidable and invertible with said drawer, and means for releasably holding the pan from sliding in said drawer.

3. A poultry crate having a body provided adjacent to its bottom with a lateral opening, an invertible drawer slidable in said opening and having a screen bottom, a pan slidable in and out through one end of said drawer and having its open side next to said screen, said pan being slidable and invertible with said drawer, said pan having a vertical hole, and said drawer having a vertical hole registering with said hole in the pan when the latter is in the closed position, and a pin removably mounted in said holes.

In testimony whereof I have signed my name to this specification.

ALBERT KARLSON.